Feb. 12, 1952     F. F. BRAMAN     2,585,732
COMBINATION AUTOMATIC CLUTCH AND VARIABLE-SPEED TRANSMISSION
Filed April 22, 1947     4 Sheets-Sheet 1

INVENTOR.
FOREST F. BRAMAN
BY M. Y. Charles
ATTORNEY.

Feb. 12, 1952 F. F. BRAMAN 2,585,732
COMBINATION AUTOMATIC CLUTCH AND VARIABLE-SPEED TRANSMISSION
Filed April 22, 1947 4 Sheets-Sheet 2

INVENTOR.
FOREST F. BRAMAN
BY M. Y. Charles
ATTORNEY.

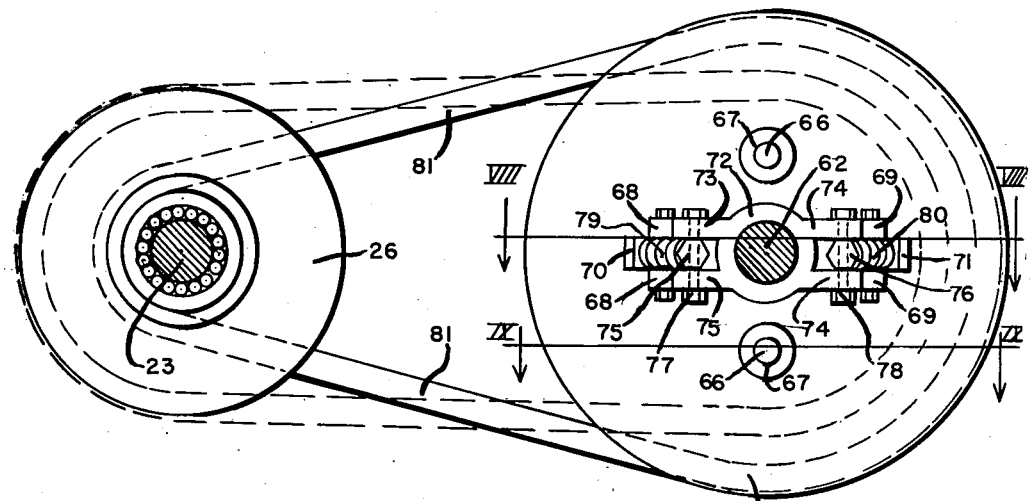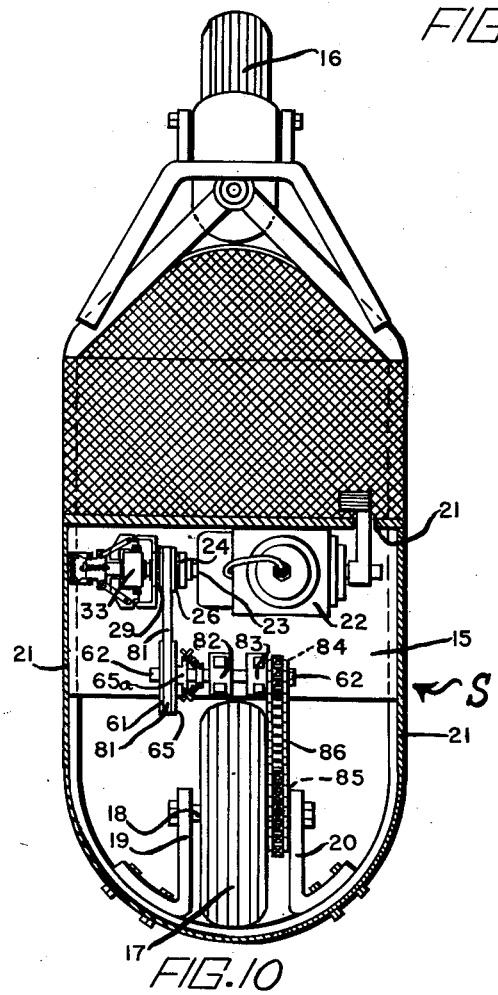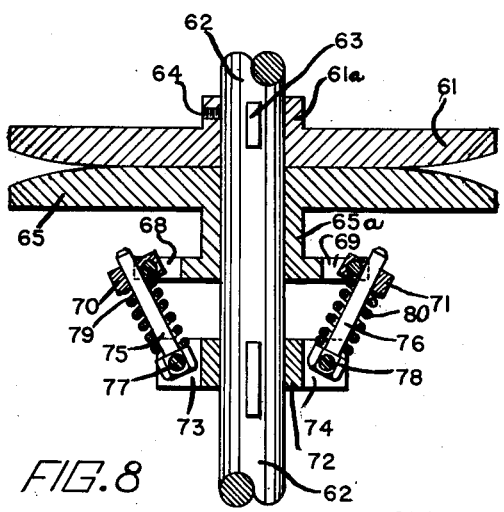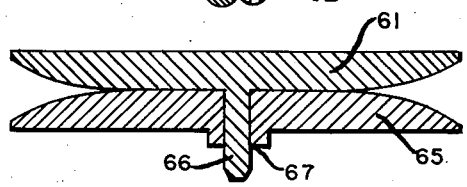

Feb. 12, 1952        F. F. BRAMAN        2,585,732
COMBINATION AUTOMATIC CLUTCH AND VARIABLE-SPEED TRANSMISSION
Filed April 22, 1947        4 Sheets-Sheet 4

INVENTOR.
FOREST F. BRAMAN
BY M. Y. Charles
ATTORNEY.

Patented Feb. 12, 1952

2,585,732

UNITED STATES PATENT OFFICE 2,585,732

COMBINATION AUTOMATIC CLUTCH AND
VARIABLE-SPEED TRANSMISSION

Forest F. Braman, Wichita, Kans.

Application April 22, 1947, Serial No. 743,089

1 Claim. (Cl. 74—230.17)

My invention relates to an improvement in automatic clutch and variable speed transmission devices of a type that is particularly desirable for use in power driven scooters and the like, although the device may be very nicely and efficiently used for driving other equipment such as lathes, circle saws, farm machinery and the like.

The object of the invention is to be able to use a power unit of such size or horse power that will maintain a predetermined speed of the machine after the machine has once been brought up to speed, and in the case of overloads or excessive power requirements in starting the device will automatically change the speed ratio between the engine or power unit, whereby the speed of the power unit will be increased to gain power for the starting or to take care of the overload. This makes it possible to use power units of a lesser horse power than would ordinarily be used and still satisfactorily drive the machine. These and other objects will be more fully explained as this description progresses.

Now referring to the accompanying drawings in which similar numerals of reference designate the same parts throughout the several figures of the drawings; Fig. 1 is a detail side view of the automatic clutch and transmission device.

Fig. 7 is a side detail view of the automatic clutch and drive pulley and the driven pulley and the effective diameter adjusting device of the driven pulley.

Fig. 8 is a detail sectional view through the driven pulley and adjustment therefor, the view being as seen from the line VIII—VIII in Fig. 7 and looking in the direction of the arrows.

Fig. 9 is a detail sectional view through the driven pulley, the view being as seen from the line IX—IX in Fig. 7 and looking in the direction of the arrows.

Fig. 10 is a top plan view of a scooter in which my invention is embodied.

Figure 1:
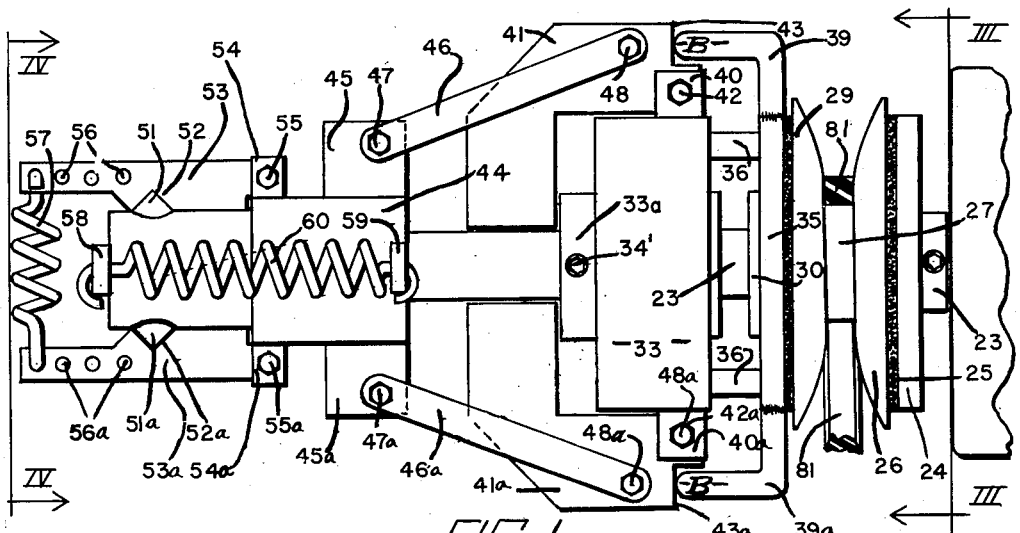

In the drawings is shown a scooter S having a platform 15 that is supported by a guidable front wheel 16, and a rear wheel 17 that is revolvably mounted on an axle element 18 that is carried by axle mount attached to the platform 15.

A housing wall 21 is positioned on and around the rear edge and across the central portion of the platform 15 and supports a seat, not shown, on which the rider of the scooter may sit.

Under the seat and supported on the platform 15 is supported a small internal combustion engine 22 that has a crank shaft 23.

Rigidly mounted on the crank shaft 23 is a circular shaped clutch plate 24 having a clutch lining 25 on the face thereof. One half 26 of a V-belt pulley is revolvably mounted on the crank shaft. The pulley half 26 is provided with a long sleevelike hub portion 27 that is integrally formed thereon and carried on rollers 28 that are positioned therein and bear against the crank shaft 23. Slidable longitudinally on the hub 27 is positioned the other half 29 of the V-belt pulley. The pulley half 29 is provided with a hub portion 30 that is integrally formed on the pulley half 29 and is slidable longitudinally on the hub 27. In the hub 27 is a slot 31 in which is slidably positioned one end of a pin 34 that is either pressed or threaded through a hole in the hub element 30 of the pulley half 29.

A clutch support element 33 is mounted on the crank shaft 23 and is rigidly held thereon by means of a set screw 34' that is threaded through a hub-like projection 33a of the clutch support element 33 and bears against the crank shaft 23.

A collar-like element 35 is slidably positioned over the pulley wheel hub element 30 and is provided with rearwardly directed drive pin elements 36 that are slidably carried in guide holes 37 in the clutch support element 33. The clutch collar 35 is provided with a clutch facing 38 which bears against the adjacent side face of the pulley half 29. The collar 35 is provided with a pair of L-shaped elements 39 and 39a. One end of each element 39 and 39a is welded to the collar 35 and the other end of the L-shaped elements extend over a portion of the clutch support element 33 for purposes that will later be described.

On and diametrically positioned across the clutch support element 33 is outwardly projecting ear-like elements 40 and 40a, between which is pivotally mounted one end of a pair of fly elements 41 and 41a, on pivot pins 42 and 42a that pass through the ear-like elements 40 and 40a and the inner edge and corner portions of the fly elements 41 and 41a. The outer corner portions of the fly elements 41a and 41 adjacent the pivot pins 42 and 42a are cut away to form shoulders 43 and 43a that are rockable around the pivot points 42 and 42a and against which the ends B of the L-shaped elements 39 and 39a rest. The fly elements 41 and 41a are L-shaped and the free ends of the fly elements 41 and 41a rest against the crank shaft 23 and are adapted to swing outwardly therefrom under the influence of centrifugal force as will later be described.

Slidably mounted on the crank shaft 23 is an action buffer element 44 on which is diametrically positioned pairs of ear-like elements 45 and 45a, between which is pivotally mounted one end of a pair of link elements 46 and 46a on pins 47 and 47a that pass through the ears 45 and 45a and the ends of the links 46 and 46a. The other end of the links 46 and 46a are pivotally connected to the inner end portion of the fly elements 41 and 41a on pivot pins 48 and 48a that are carried by the fly elements 41 and 41a.

On the crank shaft 23 is a latch block 49 that is rigidly held thereon by means of a set screw 50 that passes therethrough and bears against the crank shaft 23 for locking purposes as will be readily understood. The latch block 49 is provided with outwardly extending V-shaped portions 51 and 51a, that are adapted to be received in V-shaped notches in a pair of fly latch bars 53 and 53a, one end of which is positioned between ear-like elements 54 and 54a and are pivotally mounted on pivot pins 55 and 55a that pass through the ears 54 and 54a and the inner ends of the latch bars 53 and 53a. The outer end portions of the latch bars 53 and 53a are provided with a series of holes 56 and 56a and the ends of a helical spring 57 are hooked in selected holes 56 and 56a in the latch bars 53 and 53a to yieldably pull the outer ends of the latch bars 53 and 53a toward each other.

A bar 58 is positioned across the outer end of the latch block 49 and is rigidly attached thereto, preferably welded.

The clutch buffer element 44 is provided with a pair of diametrically positioned and outwardly extending ear-like elements 59, and the ends of a pair of helical springs 60 and 60a are hooked in the ears 59 and outer ends of the bar 58 to yieldably hold the clutch buffer element 44 against the latch block 49.

Associated with the foregoing described device is a driven pulley device comprising a pulley half 61 having a hub portion 61a, the pulley half 61 and hub portion 61a being rigidly mounted on a shaft 62 by means of a key 63 which is seated in the shaft 62 and pulley half 61 and hub 61a thereof which prevents rotary movement of the pulley half 61 on the shaft 62, and a set screw 64 that is threaded through the hub portion 61a and bears against the shaft 62 to prevent longitudinal movement of the pulley half 61—61a on the shaft 62. A second pulley half 65 is slidably mounted on the shaft 62 and rests against the first pulley half 61, and pins 66 rigidly mounted on, or integrally formed on the pulley half 61 slidably pass through holes 67 in the pulley half 61. The pulley half 65 is provided with a hub portion 65a on which is formed two pairs of outwardly extending ear-like elements 68 and 69 between which is pivotally mounted guide blocks 70 and 71.

Rigidly mounted on the shaft 62 is block element 72 having two pairs of diametrically positioned and outwardly extending ear-like elements 73 and 74 integrally formed thereon.

Between the pairs of ear-like elements 73 and 74 is positioned one end of guide pins 75 and 76, and pivot pins 77 and 78 pass through the ears 73 and 74 and their associated guide pins 75 and 76 to form a pivot mounting for one end of each guide pin 75 and 76. The other end of the guide pins 75 and 76 slidably pass through holes in the pivoted guide blocks 70 and 71, and helical springs 79 and 80 are positioned, one around each guide pin 75 and 76 and are under compression between the heads of the pivot pins 75 and 76, and the pivot blocks 70 and 71 and serve to yieldably urge movement of the pulley half 65 toward the pulley half 61. A V-belt 81 passes around and engages the two pulleys 26—29 and 61—65 as will later be described more in detail.

The shaft 62 is revolvably carried in bearings 82 and 83 that are rigidly mounted on the platform 15 of the scooter.

On the other end of the shaft 62 is rigidly mounted a sprocket wheel 84, and another sprocket wheel 85 is rigidly connected with the rear drive 17 of the scooter, and a drive chain 86 passes around and engages the two sprocket wheels 84 and 85 for driving purposes. The operation of the foregoing described device is as follows.

Figure 2:
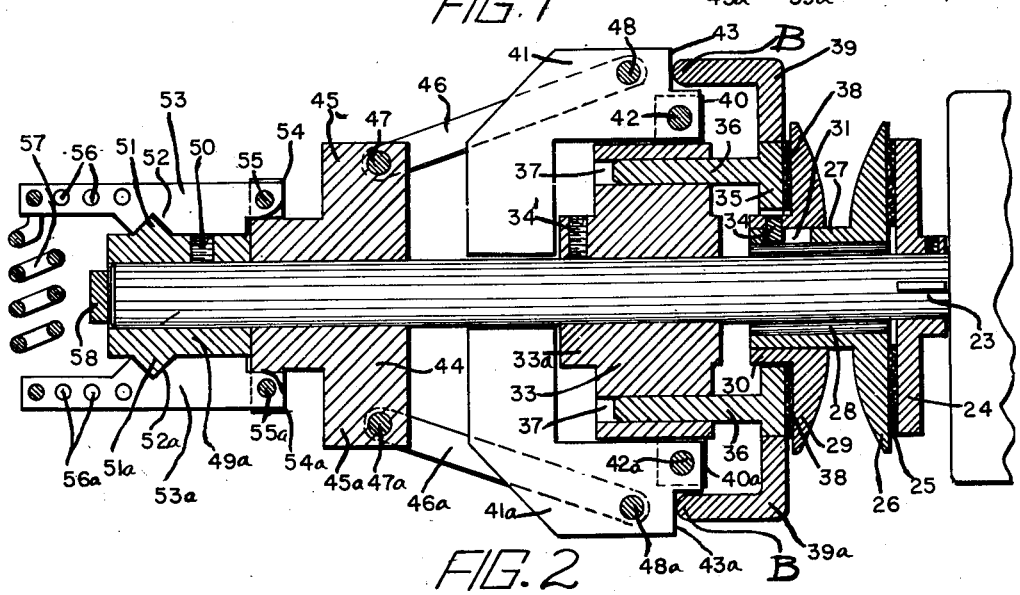
Fig. 2 is a detail longitudinal sectional view through the automatic clutch and transmission device.
Figure 3:
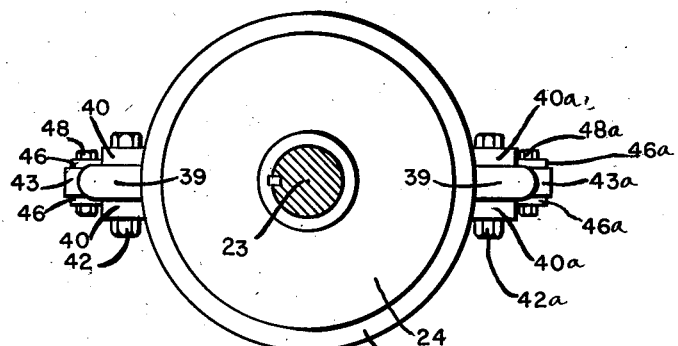
Fig. 3 is a detail end view of the automatic clutch and transmission device, the view being as seen from the line III—III in Fig. 1 and looking in the direction of the arrows.
Figure 4:
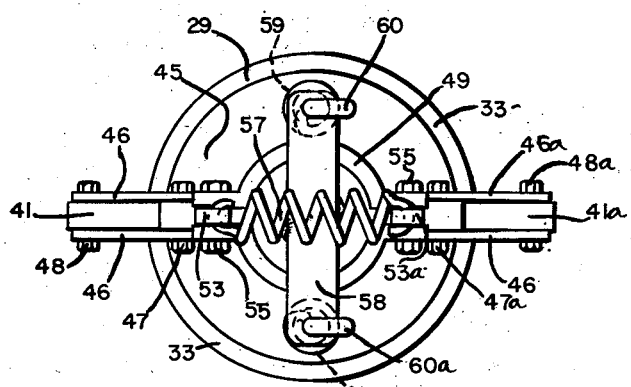
Fig. 4 is an end view of the automatic clutch and transmission device, the view being as seen from the line IV—IV in Fig. 1, and looking in the direction of the arrows.
Figure 5:
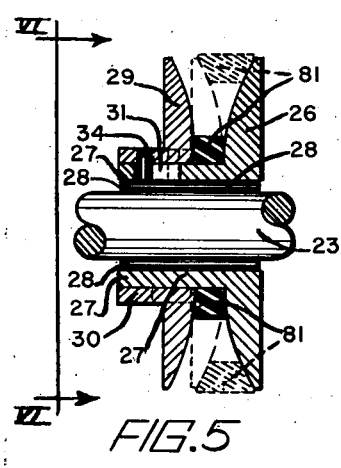
Fig. 5 is a detail sectional view through the clutch and transmission pulley and illustrating how the variable speeds are achieved.
Figure 6:
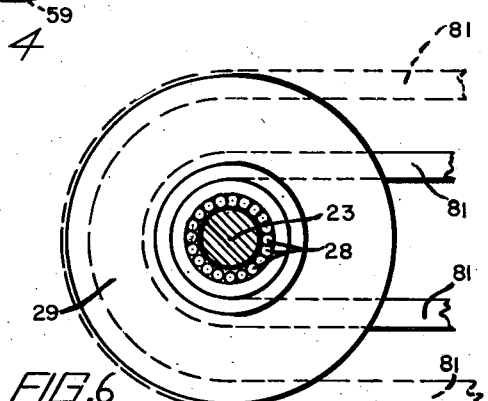
Fig. 6 is an end view of the device shown in Fig. 5, the view being as seen from the line VI—VI in Fig. 5 and looking in the direction of the arrows.

The engine 22 may be started and while running at slow idling speed the parts shown in Figures 1 and 2 will revolve, but remain in the position shown and the V-belt 81 will rest loosely against the hub portion 27 of the pulley half and will not be driven. Now as the engine 22 is speeded up, the fly elements 41 and 41a, and the latch bars 53 and 53a will swing outwardly under the influence of centrifugal force and the rocking movement of the inner ends of the fly elements 41 and 41a will cause the shoulders 43 and 43a thereof to press against the ends B of the elements 39 and 39a and move the collar 35 toward the pulley half 29, whereupon the clutch lining 38 will engage the outside face of the pulley half 29 and press the pulley half 29 toward the pulley half 26 whereupon the inside face of the pulley half 29 will engage the adjacent side of the V-belt 81 against the inside face of the pulley half 26 whereupon the outside face of the pulley half 26 will be moved and pressed against the clutch lining 25 on the clutch plate 24, whereupon the V-belt 81 will be gripped between the inner faces of the pulley halves 26 and 29 at a point close to the hub 27 which is in effect a small diameter V-belt pulley driving the belt 81 which in turn drives a large diameter V-belt pulley 61—65 which drives the shaft 62 and small sprocket 84 which drives the chain 86 that drives the large sprocket 85 and attached traction wheel 17 to propel the scooter. This, in effect, is a low speed gear reduction. Now as the scooter begins to move and its resistance to the speed of the engine diminishes the speed of the engine will therefore increase and the fly members 41—41a will swing outwardly further and thereby move the inside faces of the pulley halves 26 and 29 closer together and will therefore force the V-belt to move toward the outer edge of the V-belt pulley 26—29 which is, in effect, an increased diameter pulley. Simultaneously with this action, the V-belt 81 will be stretched and will therefore press between and separate the two driven pulley halves 61—65 against the pressure of the springs 79 and 80. This effects a smaller working diameter of the pulley 61—65 and the gear ratio between the pulleys 26—29 and 61—65 is changed so that a lesser number of revolutions of the pulley 26—29 is required to effect one revolution of the pulley 61—65.

To prevent the pulley 26-29 from gripping the belt 81 too quickly as the engine speeds up, the spring 57 will yieldably resist the outwardly swinging movement of the latch bars 53 and 53a, and when the speed has reached a high enough degree the latch bars 53 and 53a will rock outwardly under the influence of centrifugal force and disengage the V-shaped portions 51 and 51a and the pull of the fly elements 41 and 41a through the links 46 and 46a on the clutch buffer element 44 will slowly move the clutch buffer element 44 toward the clutch support element 33 in opposition to the pull of the springs 60 and 60a which will eliminate the quick grabbing of the belt 81 and also the jerky starting of the scooter.

If desired, a solid one piece V-belt pulley 65a may be substituted for the pulley 61—65 and may be rigidly mounted on the shaft 62. If the solid pulley is used it will be necessary to provide a belt take-up to take up and yield the slack in the belt 81 as the effective diameter of the pulley 26—29 varies as above described. What is probably the preferable take-up device is shown in Figures 11, 12 and 13.

Figure 11:
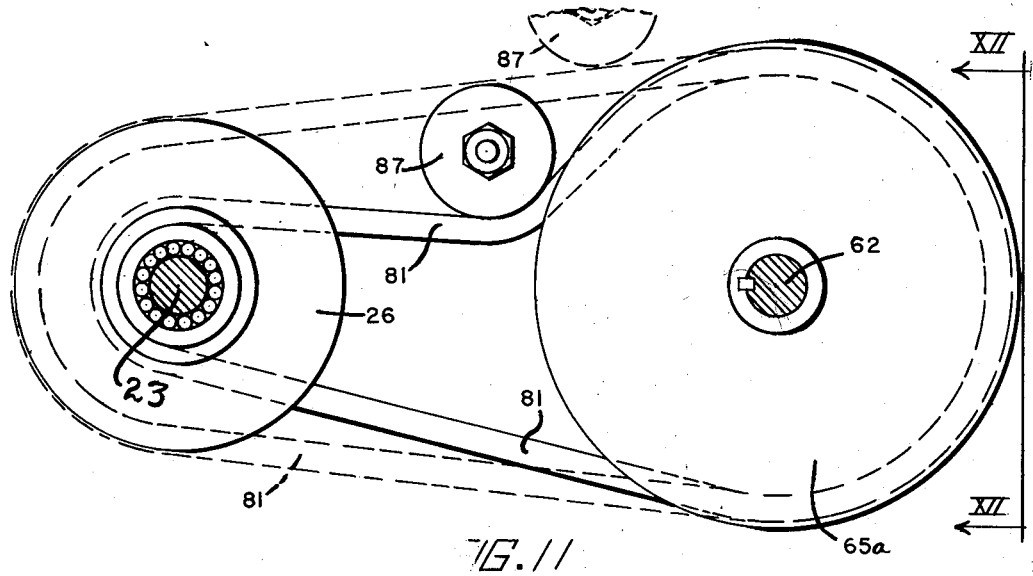
Fig. 11 is a side view of a modified form of the belt take-up device that may be employed instead of that shown in Figures 7, 8 and 9.
Figure 12:
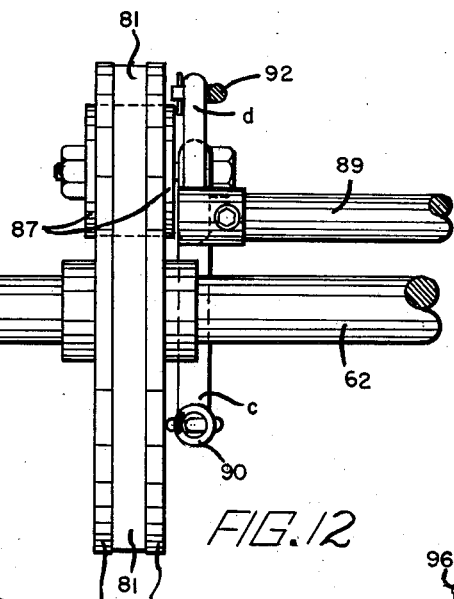
Fig. 12 is a top plan view of the device shown in Fig. 11.
Figure 13:
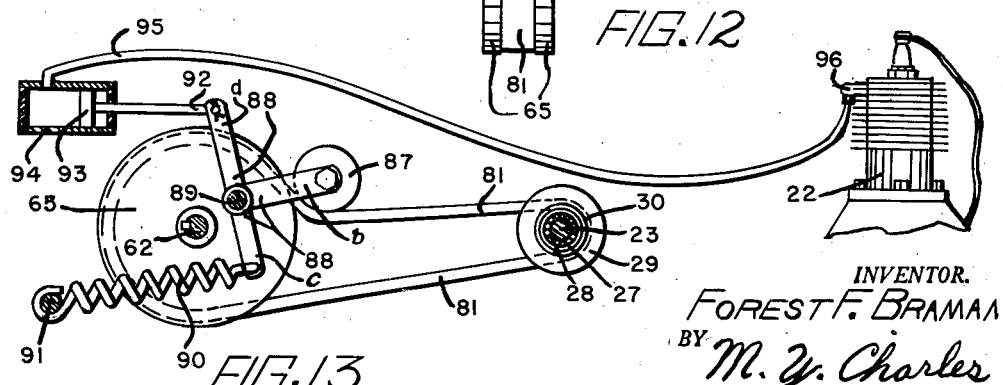
Fig. 13 is a side view of a vacuum operated belt take-up device which may be applied to the device shown in Figures 11 and 12.

In Figures 11, 12 and 13 the take-up device is shown as comprising an idler pulley 87 that rests on the V-belt 81 and is revolvably carried on the outer end of one leg b of a T-shaped lever element that is rigidly carried on a shaft 89 that is revolvably carried in bearings, not shown, that may be rigidly mounted on and carried by the scooter platform 15. To the outer end of the leg c of the lever element 88 is connected one end of a helical spring 90 and the other end of which is hooked around any suitable and rigid part 91 of the machine, the spring 90 being so tensioned as to rock the lever element 88 so that the idler pulley 87 will move toward a line passing through the axes 23 and 62 to take up the slack in the V-belt 81 as shown in Figures 11 and 13.

To the outer end of the bed d of the crank element 88 is connected one end of a piston rod 92, the other end of which is connected to a piston 93 that is slidable back and forth in a cylinder 94. One end of a tube 95 is connected with and opens into the rear portion of the cylinder 94 and the other end of the tube 95 is connected with and opens into the intake manifold 96 of the internal combustion engine 22. The operation of this take-up device is as follows.

As the engine 22 idles and is pulling little or no load, the engine will develop a vacuum in the intake manifold 96 and tube 95 and also in the cylinder 94, whereupon the piston 93 will be drawn rearwardly in the cylinder 94 and the piston rod 92 will therefore pull the leg d of the lever element 88 so as to release the pressure of the idler pulley 87 on the V-belt 81 and the pulleys 26—29 and 65a may slip on the belt and the scooter may then coast at a speed greater or slower than it would if the scooter was being driven by the engine. Now, if the engine be speeded up the vacuum developed thereby would be relieved and the spring 90 would rock the lever 88 to cause the idler pulley 87 to press against and tighten the belt 81 to be driven by the pulley 26—29 and drive the pulley 65a to propel the scooter. As the pulley 26—29 increases and decreases its effective diameter as above described, the lever 88 will rock by reason of the tension of the spring 90 to keep the belt 81 tight for driving purposes.

While what is probably the preferred form of the invention is shown in the drawings and described in the foregoing specification, it is to be understood that such modifications of the invention may be employed as lie within the scope of the appended claim without departing from the spirit and intention of the invention. Now having fully shown and described my invention, what I claim is:

In a combination clutch and variable speed transmission device of the kind described; a drive shaft, a clutch plate rigidly mounted on said drive shaft, a two piece V-belt drive pulley, one piece of the V-belt pulley having a long hub thereon, said hub being revolvably and longitudinally slidably mounted on the said drive shaft, one side of said one piece of the V-belt pulley having a face engageable with the said clutch plate, the second piece of said V-belt drive pulley having a hub as a part thereof, the hub of the second piece of the drive pulley being non-rotatably, but longitudinally slidably mounted on the hub of the first said drive pulley piece, a clutch ring and a supporting block therefor, said supporting block being rigidly carried on the said drive shaft, said clutch ring being movable to and from engagement with the second said piece of the V-belt drive pulley to move the second said piece of the V-belt drive pulley toward the first said piece of the V-belt drive pulley to change the diametrical point of engagement of a V-belt positioned between the two pulley pieces and in turn bind the composite V-belt pulley between the said clutch plate and clutch ring, and centrifugally operated means for moving said clutch ring in the manner stated, and means for resisting the movement of the centrifugally operated means for moving the said clutch ring, said means for resisting the movement of the centrifugally operated means for moving the said clutch ring comprising an element slidably longitudinally on the said drive shaft, and links pivotally connecting between the said longitudinally slidable element and the said centrifugally operated means, a pair of latch levers, one end of each of said latch levers being pivotally attached to the said longitudinally slidable element, the other ends of the latch levers having a spring connected to and tensioned therebetween, a latch block, said latch block being rigidly carried on one end of the said drive shaft, said latch block having outwardly projecting and diametrically disposed projections thereon, said latch levers having notches therein to receive the said projections, said latch levers being releasable from the said latch block by means of centrifugal force operating against the tension of said spring to release the first said centrifugally operated means for the quick movement of the said clutch ring for the operation thereof, as aforestated.

FOREST F. BRAMAN.

REFERENCES CITED

The following references are of record in the file of this patent:

UNITED STATES PATENTS

| Number | Name | Date |
|---|---|---|
| 1,966,831 | Oakes | July 17, 1934 |
| 2,051,488 | Kottlowski | Aug. 18, 1936 |
| 2,221,585 | Klein | Nov. 12, 1940 |
| 2,260,798 | Burns | Oct. 28, 1941 |
| 2,283,267 | Kohl | May 19, 1942 |
| 2,378,549 | Gruenhagen | June 19, 1945 |
| 2,420,100 | Salsbury | May 6, 1947 |
| 2,512,816 | Sweger | June 27, 1950 |